Patented Aug. 2, 1932

1,870,131

UNITED STATES PATENT OFFICE

AUGUST MEIER, OF MUNICH, GERMANY

PROCESS FOR THE PRODUCTION OF A MIXED FERTILIZER CONSISTING OF AMMONIUM BICARBONATE AND AMMONIUM SULPHATE

No Drawing. Application filed May 12, 1931, Serial No. 536,952, and in Germany May 14, 1930.

Numerous processes for the production of mixed fertilizers are known.

The object of the present invention is the production of such a mixed fertilizer consisting of ammonium bicarbonate and ammonium sulphate. As is known an important disadvantage of ammonium bicarbonate which is in itself extremely valuable as a fertilizer consists in the fact that it is in general unstable, that it is very easily volatilized during normal storage.

An important advantage of the new process resides in the fact that the ammonium bicarbonate is obtained in a form in which it is stable as regards storage. A specially valuable mixed fertilizer is therefore obtained by the new process from the constituents above mentioned, and moreover by a relatively very simple measure.

According to the invention in order to obtain the aforesaid mixed fertilizer liquid ammonia is partially saturated with carbon dioxide until just before the precipitation of ammonium bicarbonate commences and at this point it is mixed with ammonium sulphate solution. If now further quantities of carbon dioxide and ammonia (preferably in vapour form) are passed into the total solution, ammonium bicarbonate and ammonium sulphate are precipitated as a mixture from the solution. It has been found that in this way the ammonium bicarbonate is obtained in a stable form as regards storage.

Therefore two important advantages are associated with this new mixed fertilizer, namely stability as regards storage and at the same time the mixed fertilizer most suited for certain purposes is obtained, whereby a very much desired cheapening of the production of the new product is attained.

The new process can subject to the basic principle, be carried out in various known devices. Apart from this it is immaterial in what manner the liquid ammonia saturated with carbon dioxide and the ammonium sulphate solution are brought together. Similarly there are various possibilities for the introduction of the additional carbon dioxide and ammonia for the purpose of reacting with the solution.

A particularly advantageous development of the process consists according to the invention in continuously introducing the necessary quantities of carbon dioxide, ammonia and ammonium sulphate solution into a mother liquor produced according to the basic principle. In this way the mixed fertilizer is obtained in an uninterrupted operation.

The fresh batch of ammonia is preferably introduced as gaseous ammonia in order not unnecessarily to dilute the solution.

*Example*

1 liter of liquid ammonia containing 155 gms. of ammonia was partially saturated with carbon dioxide in known manner per se until just before precipitation of ammonium bicarbonate commenced. This solution was then mixed with a saturated solution of ammonium sulphate and then this solution was treated with carbon dioxide and ammonia, the temperature being maintained below 25° C. This treatment was effected by passing carbon dioxide and ammonia at the same time in gaseous form. The duration of this treatment was spread over several days during which time the reaction mass was thoroughly mixed afresh from time to time by stirring. After this treatment the reaction mass was allowed to stand for a few hours.

From this treatment there resulted 680 gms. of a mixed fertilizer composed of ammonium sulphate and ammonium bicarbonate, and containing 35% of ammonium bicarbonate and 65% of ammonium sulphate. This product was stored in a flat vat open to the atmosphere. After five weeks the fertilizer had the same appearance as on the day it was produced. No appreciable loss in weight had occurred. Accurate weighing showed a loss of only 1.3%. The new fertilizer is therefore practically completely stable, and furthermore in practical use the storage is not in general open to the atmosphere with a relatively large exposed surface, but the materials are considerably less accessible by the air than in the above described storage experiment.

I claim:

1. A process for the production of a mixed fertilizer containing ammonium bicarbonate and ammonium sulphate, which comprises introducing carbon dioxide into a concentrated ammonia solution until just before precipitation of ammonium bicarbonate commences, mixing the solution with a saturated ammonium sulphate solution, and treating the mixed solutions with carbon dioxide and ammonia.

2. A process for the production of a mixed fertilizer containing ammonium bicarbonate and ammonium sulphate, which comprises preparing a solution saturated with ammonia and containing carbon dioxide up to a point of saturation just before precipitation of ammonium bicarbonate commences, and continuously introducing carbon dioxide and ammonia into the solution with the simultaneous addition of saturated ammonium sulphate solution, the proportions of carbon dioxide, ammonia and ammonia sulphate being substantially equivalent to the amounts of ammonium bicarbonate and ammonium sulphate being precipitated.

3. A process for the production of a mixed fertilizer containing ammonium bicarbonate and ammonium sulphate, comprising partially saturating a concentrated ammonia solution with carbon dioxide until just before precipitation of ammonium bicarbonate commences, mixing the solution with a saturated ammonium sulphate solution, and passing carbon dioxide and gaseous ammonia into the mixed solutions.

4. A process for the production of a mixed fertilizer containing ammonium bicarbonate and ammonium sulphate which comprises preparing a solution saturated with ammonia and containing carbon dioxide up to a point of saturation just before precipitation of ammonium bicarbonate commences, and continuously adding saturated ammonium sulphate solution while simultaneously passing carbon dioxide and gaseous ammonia into the mixed solutions, the proportions of carbon dioxide, ammonia and ammonium sulphate being substantially equivalent to the amounts of ammonium bicarbonate and ammonium sulphate being precipitated.

5. A process for the production of a mixed fertilizer containing ammonium bicarbonate and ammonium sulphate, which comprises preparing a solution containing ammonia and carbon dioxide just short of the point of precipitation of ammonium bicarbonate, mixing the solution with saturated ammonium sulphate solution, and treating the mixed solutions with carbon dioxide and ammonia.

6. A stable mixed fertilizer consisting of a precipitated mixture of ammonium bicarbonate and ammonium sulphate.

In testimony whereof I have signed my name to this specification.

AUGUST MEIER.